United States Patent
Jeon

(10) Patent No.: US 12,005,971 B2
(45) Date of Patent: Jun. 11, 2024

(54) RACK ASSIST TYPE POWER STEERING APPARATUS

(71) Applicant: HL MANDO CORPORATION, Pyeongtaek (KR)

(72) Inventor: InHwan Jeon, Seongnam (KR)

(73) Assignee: HL MANDO CORPORATION, Pyeongtaek (KR)

( * ) Notice: Subject to any disclaimer, the term of this patent is extended or adjusted under 35 U.S.C. 154(b) by 25 days.

(21) Appl. No.: 18/052,869

(22) Filed: Nov. 4, 2022

(65) Prior Publication Data
US 2023/0159089 A1 May 25, 2023

(30) Foreign Application Priority Data
Nov. 19, 2021 (KR) .................... 10-2021-0160385

(51) Int. Cl.
*B62D 5/04* (2006.01)
*B62D 3/12* (2006.01)

(52) U.S. Cl.
CPC ......... *B62D 5/0448* (2013.01); *B62D 5/0403* (2013.01); *B62D 5/0421* (2013.01); *B62D 3/12* (2013.01)

(58) Field of Classification Search
CPC ...... B62D 5/0448; B62D 5/0421; B62D 3/12; B62D 5/0424; B62D 3/02; F16H 25/22
See application file for complete search history.

(56) References Cited

U.S. PATENT DOCUMENTS

| 2014/0353068 A1* | 12/2014 | Yamamoto | B62D 5/0412 180/444 |
| 2017/0259844 A1* | 9/2017 | Asakura | F16H 7/023 |
| 2019/0136947 A1* | 5/2019 | Nakayama | F16H 25/2219 |

FOREIGN PATENT DOCUMENTS

| JP | 2015000594 A | * | 1/2015 |
| JP | 2019147536 A | * | 9/2019 |
| KR | 20170138660 A | * | 12/2017 |

OTHER PUBLICATIONS

Suzuki et al. JP 2019 147536 English Machine Translation (Year: 2019).*
H. Kim KR 2017 0138660 English Machine Translation (Year: 2017).*

* cited by examiner

*Primary Examiner* — Karen Beck
(74) *Attorney, Agent, or Firm* — Harvest IP Law, LLP

(57) ABSTRACT

A rack assist type power steering apparatus according to the embodiments of the present disclosure comprises a rack bar provided with an outer screw groove on an outer circumferential surface, a ball nut having an inner screw groove corresponding to the outer screw groove on an inner circumferential surface, and a bearing coupled to an outer circumferential surface, and a nut pulley provided with a belt coupling portion on an outer peripheral surface, and one end of an inner circumferential surface is provided with a support end coupled to an outer circumferential surface of the ball nut to support the bearing, and an other end of an inner circumferential surface is provided with an enlarged diameter portion which is stepped from the support end and increases in inner diameter.

14 Claims, 10 Drawing Sheets

RACK ASSIST TYPE POWER STEERING APPARATUS

CROSS REFERENCE TO RELATED APPLICATION

This application claims the benefit and priority from Korean Patent Application No. 10-2021-0160385, filed in the Republic of Korea on Nov. 19, 2021, the entire contents of which are hereby incorporated by reference for all purposes as if fully set forth into the present application.

BACKGROUND

Field of the Disclosure

Embodiments of the present disclosure relate to a rack assist type power steering apparatus. More specifically, in the present embodiments, the nut pulley and bearing will not be separated from the ball nut, deformed or damaged even if the vehicle is continuously steered while driving. And the present embodiments prevent the slip of the nut pulley due to an impact transmitted from the road surface or an excessive load during operation, thereby transmitting accurate steering assistance force to the ball nut.

Description of the Related Art

A general rack assist type power steering apparatus includes a steering system that extends from the steering wheel to both road wheels and an auxiliary power mechanism that supplies steering assistance power to the steering system.

Such a conventional rack assist type power steering apparatus includes a motor controlled by an electronic control device, a motor pulley fixed to the motor shaft, a ball nut that combines with a rack bar through a ball, a return tube coupled to a ball nut and circulating the ball, a nut pulley coupled to the outer circumferential surface of the ball nut, a belt coupled to the motor pulley and the nut pulley.

However, this rack assist type power steering apparatus had problems in that the nut pulley or the bearing is detached, deformed or damaged due to the vibration generated by continuous steering while driving and the impact transmitted from the road surface.

In addition, this rack assist type power steering apparatus had problems in that the nut pulley slips due to an impact transmitted from the road surface or an excessive load during operation, so that the steering assistance power is lowered and the efficiency of power transmission is lowered, so that the accurate steering assistance force cannot be transmitted.

SUMMARY OF THE DISCLOSURE

Embodiments of the present disclosure provide a rack assist type power steering apparatus in which the nut pulley and bearing will not be separated from the ball nut, deformed or damaged even if the vehicle is continuously steered while driving. And the present embodiments prevent the slip of the nut pulley due to an impact transmitted from the road surface or an excessive load during operation, thereby transmitting accurate steering assistance force to the ball nut.

A rack assist type power steering apparatus according to the embodiments of the present disclosure may comprise a rack bar provided with an outer screw groove on an outer circumferential surface, a ball nut having an inner screw groove corresponding to the outer screw groove on an inner circumferential surface, and a bearing coupled to an outer circumferential surface, and a nut pulley provided with a belt coupling portion on an outer peripheral surface, and one end of an inner circumferential surface is provided with a support end coupled to an outer circumferential surface of the ball nut to support the bearing, and an other end of an inner circumferential surface is provided with an enlarged diameter portion which is stepped from the support end and increases in inner diameter.

According to the embodiments of the present disclosure, there is provided a rack assist type power steering apparatus in which the nut pulley and bearing will not be separated from the ball nut, deformed or damaged even if the vehicle is continuously steered while driving. And the present embodiment provides a rack assist type power steering apparatus capable of transmitting an accurate steering assist force to the ball nut by preventing slippage of the nut pulley due to an impact transmitted from the road surface or excessive load during operation.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Figure 1:
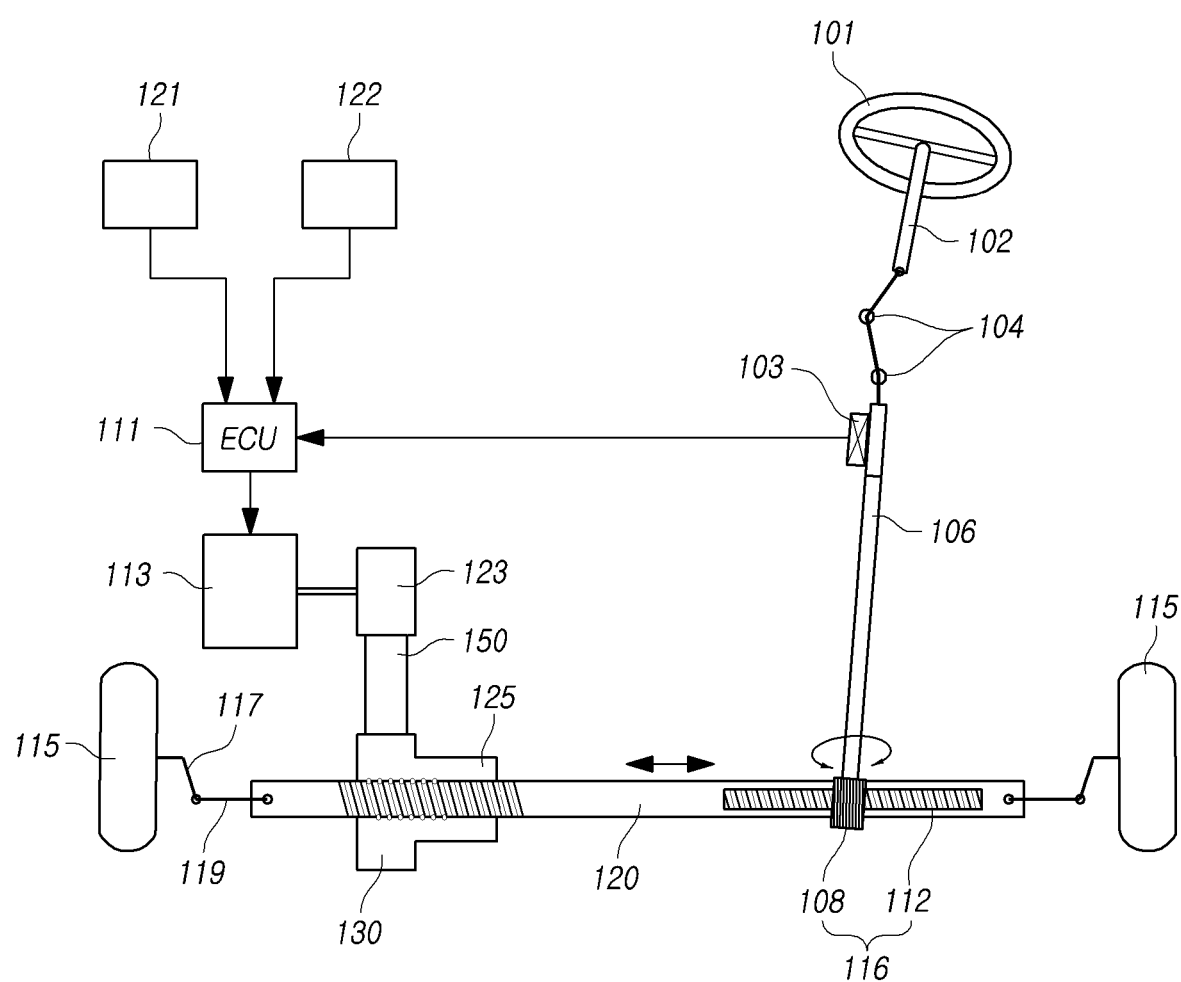
FIG. 1 is a schematic view illustrating a rack assist type power steering apparatus according to the embodiments of the present disclosure.

In the following description of examples or embodiments of the present disclosure, reference will be made to the accompanying drawings in which it is shown byway of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
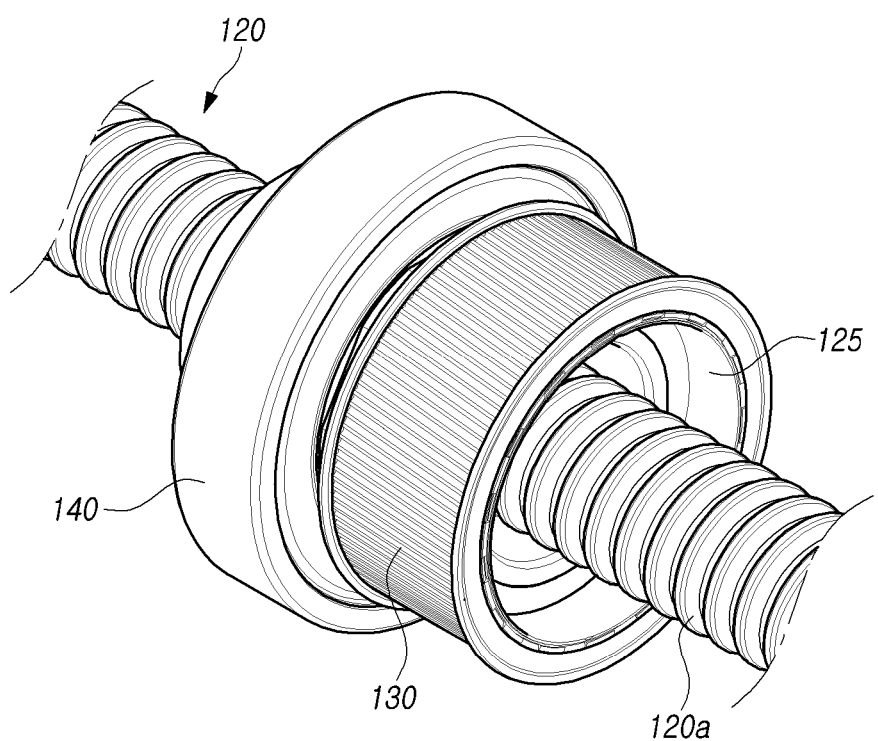
FIG. 2 is a perspective view illustrating a rack assist type power steering apparatus according to the embodiments of the present disclosure.
Figure 3:
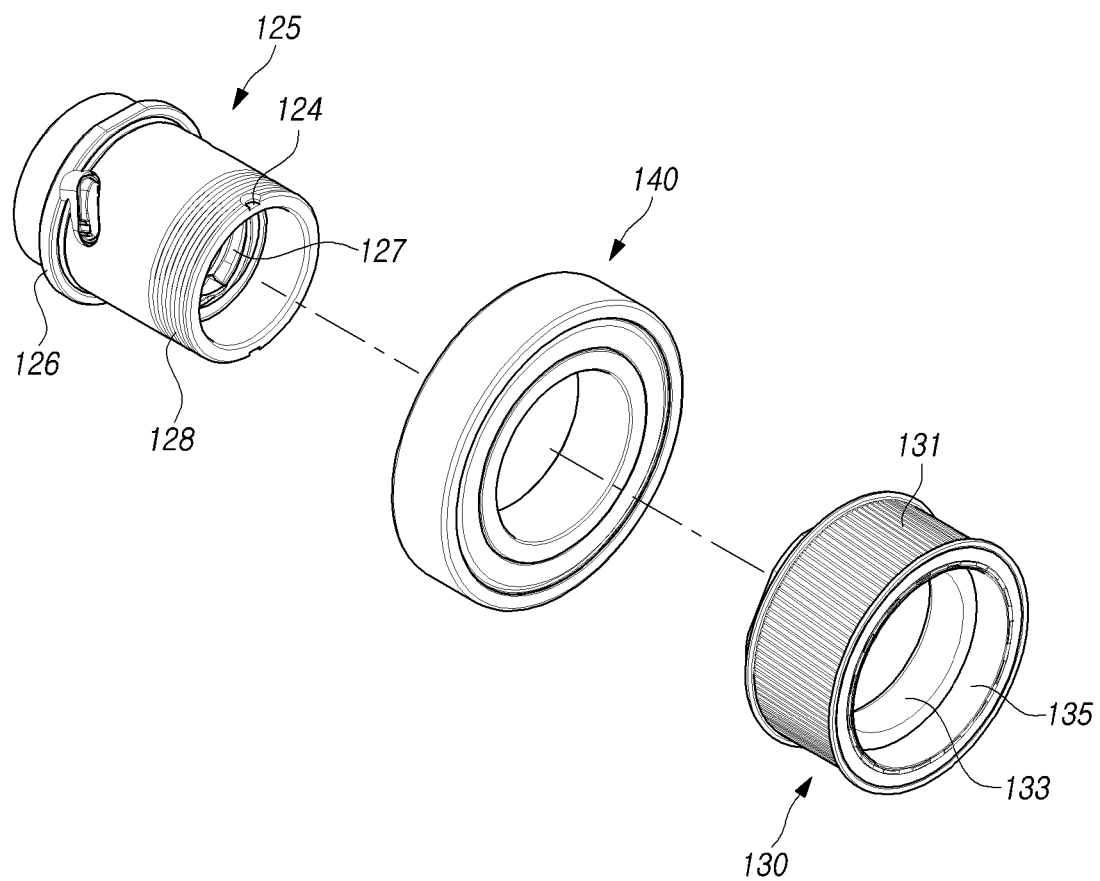
FIGS. 3 and 4 are exploded perspective views illustrating a rack assist type power steering apparatus according to the embodiments of the present disclosure.
Figure 4:
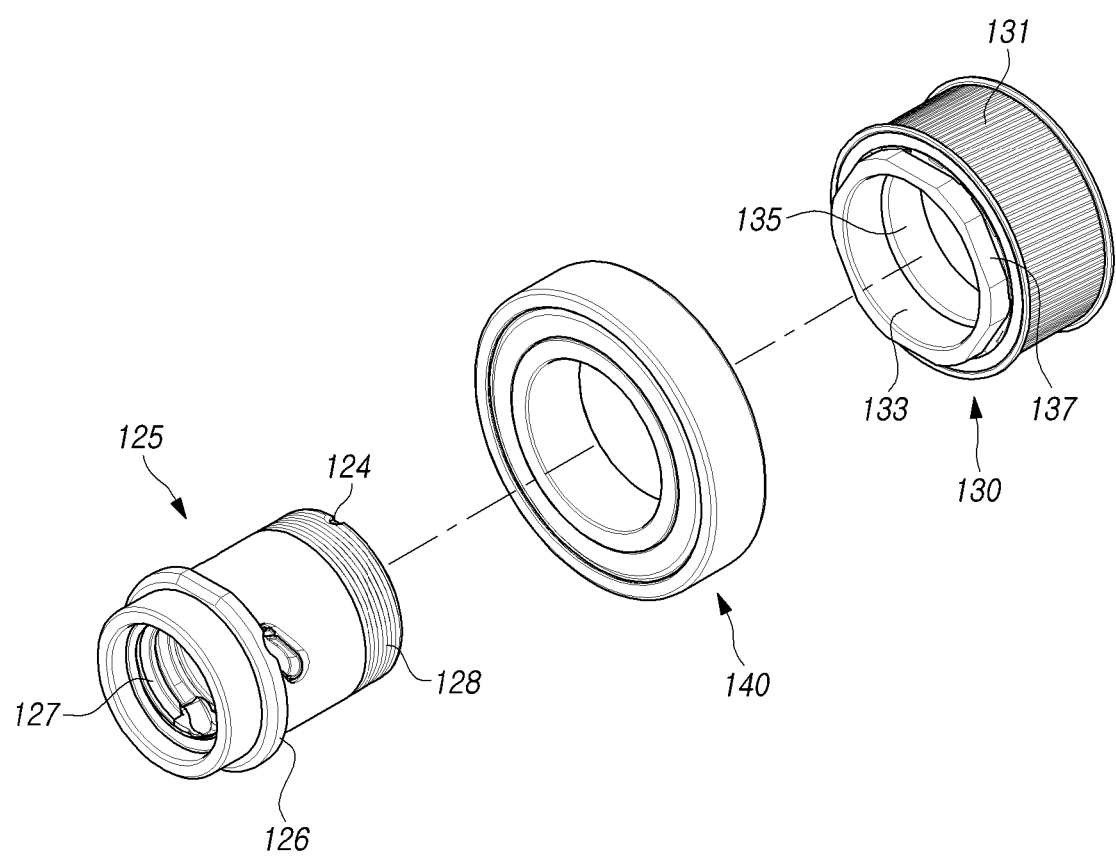
Figure 5:
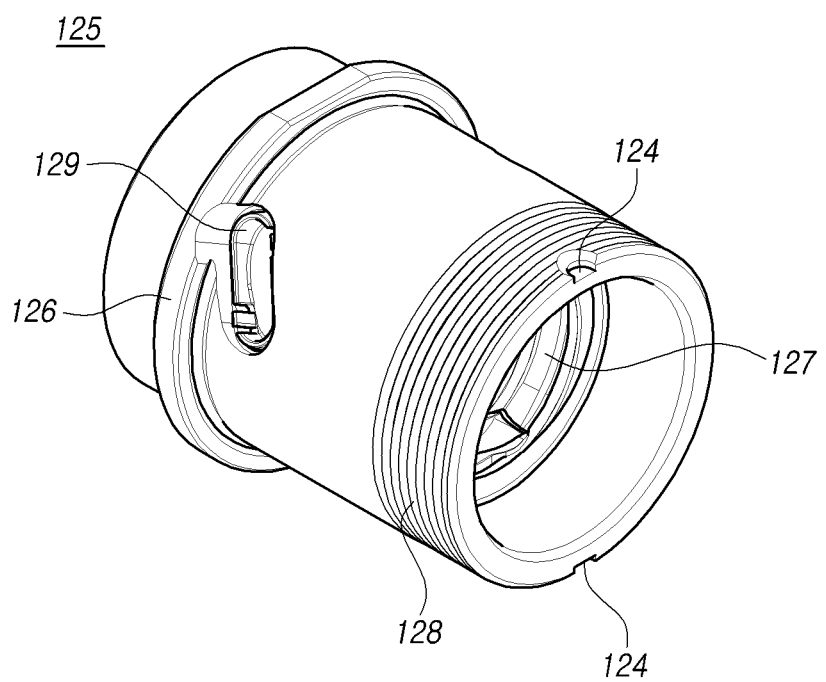
FIG. 5 is a perspective view illustrating a rack assist type power steering apparatus according to the embodiments of the present disclosure.
Figure 6:
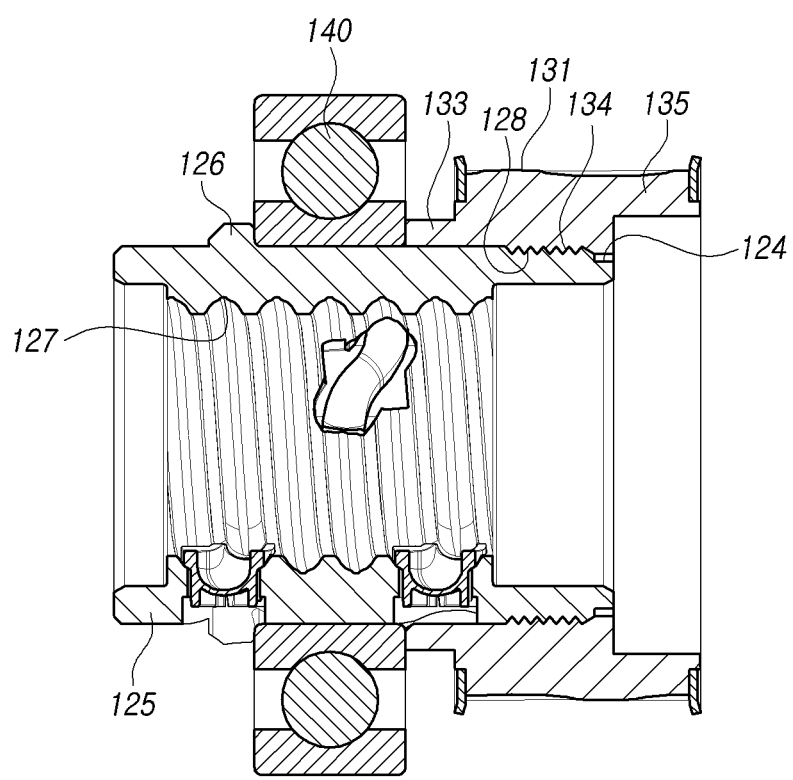
FIGS. 6 and 7 are cross-sectional views illustrating a rack assist type power steering apparatus according to the embodiments of the present disclosure.
Figure 7:
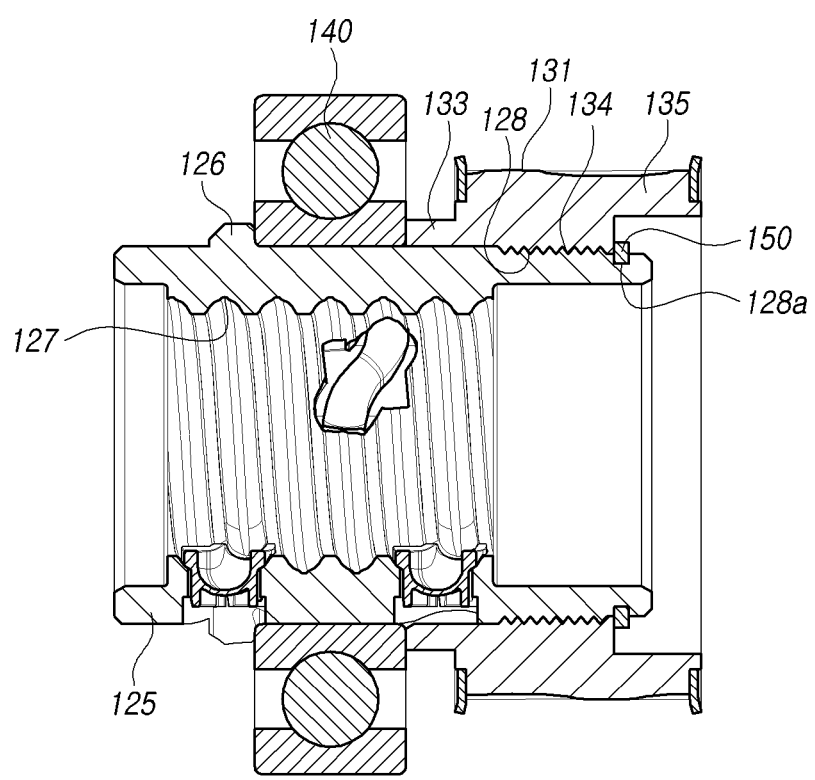
Figure 8:
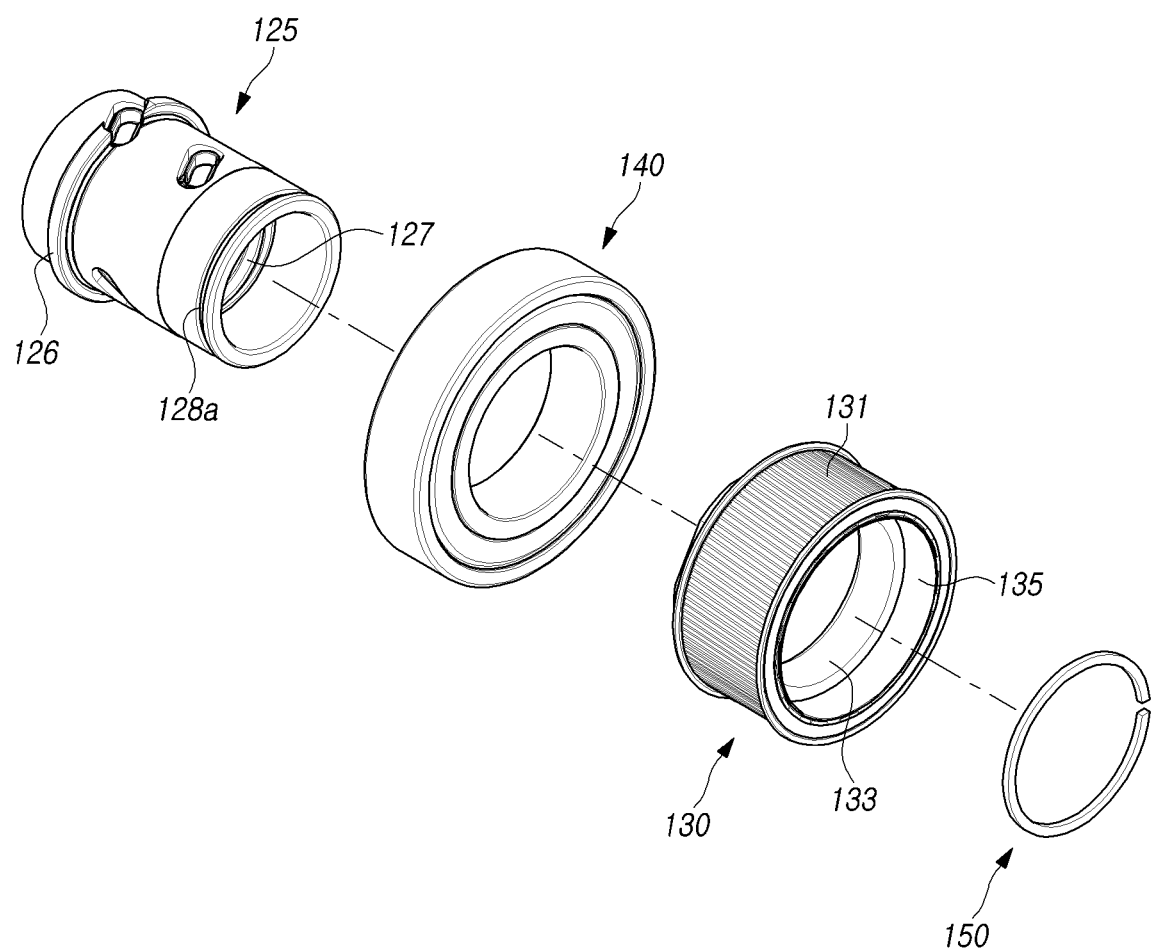
FIG. 8 is an exploded perspective view illustrating a rack assist type power steering apparatus according to the embodiments of the present disclosure.
Figure 9:
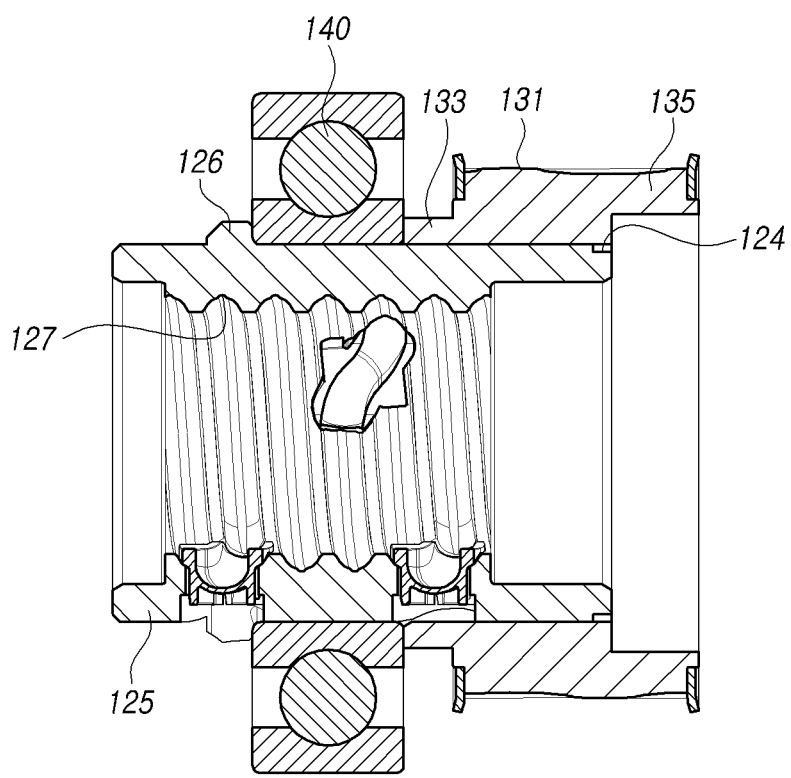
FIGS. 9 and 10 are cross-sectional views illustrating a rack assist type power steering apparatus according to the embodiments of the present disclosure.
Figure 10:
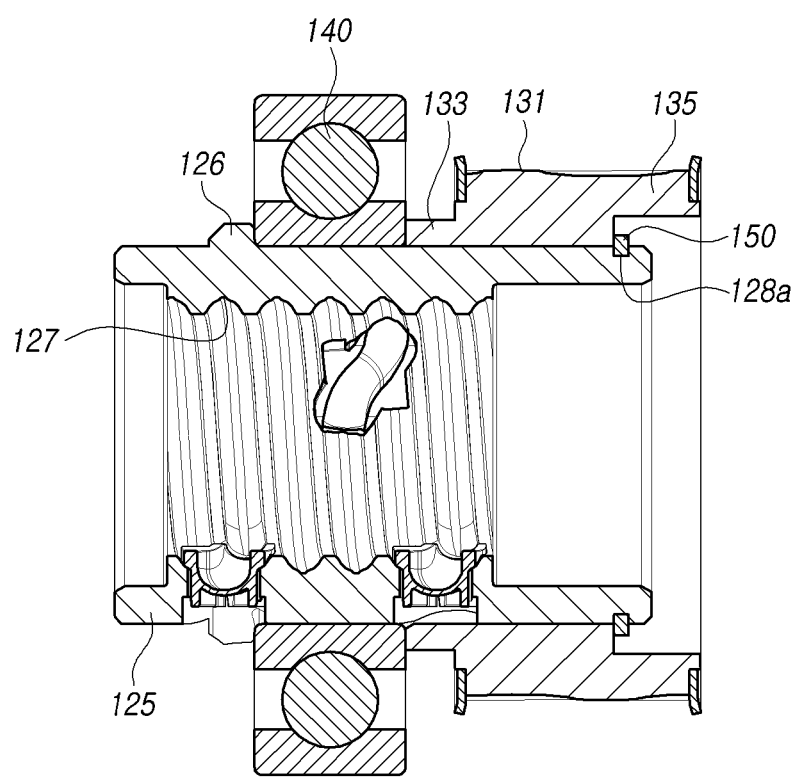

FIG. 1 is a schematic view illustrating a rack assist type power steering apparatus according to the embodiments of the present disclosure; FIG. 2 is a perspective view illustrating a rack assist type power steering apparatus according to the embodiments of the present disclosure; FIGS. 3 and 4 are exploded perspective views illustrating a rack assist type power steering apparatus according to the embodiments of the present disclosure; FIG. 5 is a perspective view illustrating a rack assist type power steering apparatus according to the embodiments of the present disclosure; FIGS. 6 and 7 are cross-sectional views illustrating a rack assist type power steering apparatus according to the embodiments of the present disclosure; FIG. 8 is an exploded perspective view illustrating a rack assist type power steering apparatus according to the embodiments of the present disclosure; FIGS. 9 and 10 are cross-sectional views illustrating a rack assist type power steering apparatus according to the embodiments of the present disclosure.

Referring to FIGS. 1 to 10, a rack assist type power steering apparatus according to the embodiments of the present disclosure may include a rack bar 120 provided with an outer screw groove 120a on an outer circumferential surface, a ball nut 125 having an inner screw groove 127 corresponding to the outer screw groove 120a on an inner circumferential surface, and a bearing 140 coupled to an outer circumferential surface, and a nut pulley 130 provided with a belt coupling portion 131 on an outer peripheral surface, and one end of an inner circumferential surface is provided with a support end 133 coupled to an outer circumferential surface of the ball nut 125 to support the bearing 140, and an other end of an inner circumferential surface is provided with an enlarged diameter portion 135 which is stepped from the support end 133 and increases in inner diameter.

In the rack assist type power steering apparatus according to the present embodiments, the torque sensor 103 is coupled to one side of the steering shafts 102 and 106 connected to the steering wheel 101, and when the driver operates the steering wheel 101, the electric signals received from the torque sensor 103, the steering angle sensor 121, the vehicle speed sensor 122, etc. that detect it are sent to the motor 113 and steer the both side wheel 115 through the tie rod 119.

In the rack assist type power steering apparatus according to the present embodiments, the upper steering shaft 102 is connected to the lower steering shaft 106 through the universal joint 104, and steering is performed through the rack-and-pinion mechanism 116 including the pinion 108 and the rack gear 112.

Here, the driving force of the motor 113 driven by the electronic controller 111 is transmitted to the ball nut 125 through the motor 113 and the belt 150, and the rack bar 120 coupled to the ball nut 125 through the ball slides in the axial direction. And a tie rod 119 is coupled to both sides of the rack bar 120, and the tie rod 119 is coupled to a knuckle arm 117 connected to the wheel 115 to steer the wheel 115.

Then, the electrical signal generated from the torque sensor 103 is sent to the electronic controller 111, and the electronic controller 111 controls the motor 113 based on the electric signals transmitted from the torque sensor 103 and the electric signals transmitted from the steering angle sensor 121 and the vehicle speed sensor 122 mounted on the vehicle.

A power transmission structure is provided on the inner circumferential surface of the ball nut 125 and the outer circumferential surface of the rack bar 120 to generate a steering assist force by sliding the rack bar 120 in the axial direction. This power transmission structure includes an outer screw groove 120a having a hemispherical or arc-shaped cross section on the outer circumferential surface of the rack bar 120 and formed in a spiral shape, a ball inserted therein, and an inner screw groove 125a having a hemispherical or arc-shaped cross section on the inner circumferential surface of the ball nut 125 to correspond to the outer circumferential screw groove 120a and spirally formed.

In the ball nut 125 having an inner screw groove 127 formed on the inner circumferential surface, several ball circulation holes 129 penetrating the inner circumferential and outer circumferential surfaces are spaced apart along the inner screw groove 127.

Accordingly, the balls rolling along the inner screw groove 127 can be circulated through a circulation tube or an end cap coupled to the ball circulation hole 129, and the bearing 140 supported by a rack housing is coupled to one side to support the rotation of the ball nut 125.

The nut pulley 130 is provided on the outer peripheral side of the ball nut 125, a belt coupling portion 131 is provided on the outer peripheral surface of the nut pulley 130, and when the belt rotates, the nut pulley 130 rotates the ball nut 125 to linearly move the rack bar 120 left and right.

One end of the inner peripheral surface of the nut pulley 130 is provided with a support end 133 coupled to the other outer peripheral surface of the ball nut 125 to support the bearing 140. The other end of the inner peripheral surface of the nut pulley 130 is provided with an enlarged diameter portion 135 that is stepped from the support end 133 and has an enlarged inner diameter.

A pulley screw portion 134 is formed on an inner peripheral surface of the support end 133 and a nut screw portion 128 is formed on an outer peripheral surface of the ball nut 125, so that the pulley screw portion 134 is screwed with the nut screw portion 128.

Further, the ball nut 125 has a fixing groove 124 formed on the outer peripheral surface of the other end to which the nut pulley 130 is coupled, so that the ball nut 125 is caulked and fixed with the end of the support end 133 of the nut pulley 130.

The end of the support end 133 of the nut pulley 130 is formed at the same position in the axial direction as the end of the ball nut 125 or is formed to protrude more in the axial direction than the end of the ball nut 125.

The caulking is performed by pressing the end of the support end 133 positioned above or below the fixing groove 124 in the drawing, which is the end of the support end 133 positioned opposite to the circumferential direction of the fixing groove 124 with a caulking tool and plastically deform it. And, it is fixed by filling the inside of the fixing groove 124 with the end of the support end 133.

Therefore, when the ball nut 125 and the nut pulley 130 are combined, they are fixed to the fixing groove 124 so that the nut pulley 130 does not slip in the ball nut 125. The driving force transmitted through the belt 150 can be accurately transmitted.

Here, the fixing grooves 124 may be one or more, and when two or more are provided, they are arranged at equal intervals in the circumferential direction of the ball nut 125. Accordingly, it is possible to distribute the load applied to the caulking portion by equally distributing the positions at which the nut pulley 130 is fixed.

In the present embodiments, two fixing grooves 124 are provided and are arranged at equal intervals in the circumferential direction, and are shown as an example in a position facing each other in the radial direction.

And, the support end 133 is formed to protrude in the axial direction with a step difference in the radial direction from the belt coupling portion 131 to support one end of the inner race of the bearing 140 in the axial direction.

A tool coupling portion 137 to which a tool is coupled is formed on the outer peripheral surface of the support end 133, so that when the nut pulley 130 is coupled to the ball nut 125, a fastening tool is mounted on the tool coupling portion 137 to facilitate screw assembly.

And, on the outer peripheral surface of the ball nut 125, a support protrusion 126 for supporting the other end of the inner ring of the bearing 140 in the axial direction is formed. Therefore when the nut pulley 130 is screwed to the ball nut 125, one end of the inner ring of the bearing 140 is supported by the support end 133, the other end of the bearing 140 is supported by the support protrusion 126 so that the bearing 140 is coupled without slipping at the fixed position.

In addition, as shown in FIG. 7, the ball nut 125 is provided with a fastening groove 128a formed in the circumferential direction on the outer peripheral surface of the other end to which the nut pulley 130 is coupled, the fastening member 150 may be coupled and fixed to the fastening groove 128a.

Here, the fastening member 150 is formed in a ring shape with one side cut out and is coupled to the fastening groove 128a and supported by the end of the support end 133, so that the nut pulley 130 is fixed so as not to move in the axial direction and prevents the screw from loosening.

In addition, as shown in FIGS. 8 to 10, the nut pulley 130 may have an inner peripheral surface of the support end 133 press-fitted to an outer peripheral surface of the ball nut 125.

As shown in FIG. 9, the ball nut 125 has a fixing groove 124 formed on the outer peripheral surface of the other end of the ball nut 125 to which the nut pulley 130 is coupled, so that the end of the support end 133 of the nut pulley 130 may be caulked and fixed.

Here, the fixing grooves 124 may be one or more, and when two or more are provided, they are arranged at equal intervals in the circumferential direction of the ball nut 125.

And, as shown in FIGS. 8 and 10, ball nut 125 is provided with a fastening groove 128a formed in the circumferential direction on the outer peripheral surface of the other end to which the nut pulley 130 is coupled, and the fastening member 150 may be coupled to the fastening groove 128a.

Here, as shown in FIG. 8, the fastening member 150 is formed in a ring shape with one side cut out, and the fastening member 150 is coupled to the fastening groove 128a and supported at the end of the support end 133.

Accordingly, the nut pulley 130 is fixed so as not to move in the axial direction, and the slip of the nut pulley 130 is prevented.

In addition, the support end 133 is formed to protrude in the axial direction with a step difference in the radial direction from the belt coupling portion 131 to support one end of the inner race of the bearing 140 in the axial direction. A support protrusion 126 for axially supporting the other end of the inner race of the bearing 140 may be formed on the outer peripheral surface of the ball nut 125.

Therefore, when the nut pulley 130 is press-fitted to the ball nut 125, one end of the inner race of the bearing 140 is supported by the support end 133 and the other end of the bearing 140 is supported by the support protrusion 126. Therefore the bearing 140 can be coupled without slipping at the position.

According to the embodiments of the present disclosure, there is provided a rack assist type power steering apparatus in which the nut pulley and bearing will not be separated from the ball nut, deformed or damaged even if the vehicle is continuously steered while driving. And the present embodiment provides a rack assist type power steering apparatus capable of transmitting an accurate steering assist force to the ball nut by preventing slippage of the nut pulley due to an impact transmitted from the road surface or excessive load during operation.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A rack assist type power steering apparatus comprising:
a rack bar provided with an outer screw groove on an outer circumferential surface;
a ball nut having an inner screw groove corresponding to the outer screw groove on an inner circumferential surface, and a bearing coupled to an outer circumferential surface; and
a nut pulley provided with a belt coupling portion on an outer peripheral surface, and one end of an inner circumferential surface is provided with a support end coupled to an outer circumferential surface of the ball nut to support the bearing in an axial direction, and an opposite end of an inner circumferential surface is provided with an enlarged diameter portion which is stepped from the support end and increases in inner diameter,
wherein a support protrusion is formed by protruding from the outer circumferential surface of the ball nut in a location where the support protrusion is in contact with one end of an inner race of the bearing such that the support protrusion supports the one end of the inner race of the bearing in an opposite axial direction.

2. The rack assist type power steering apparatus of claim 1, wherein a pulley screw portion is formed on an inner circumferential surface of the support end and a nut screw portion is formed on an outer circumferential surface of the ball nut, so that the pulley screw portion is screwed with the nut screw portion.

3. The rack assist type power steering apparatus of claim 2, wherein a fixing groove is formed on an outer circumferential surface of the ball nut to which the nut pulley is coupled, and is caulked and fixed to an end of the support end of the nut pulley.

4. The rack assist type power steering apparatus of claim 3, wherein the fixing groove is one or more, and when two or more are provided, they are arranged at equal intervals in a circumferential direction of the ball nut.

5. The rack assist type power steering apparatus of claim 2, wherein the support end is formed to protrude in the axial direction with a step difference in a radial direction from the belt coupling portion to support an opposite end of the inner race of the bearing in the axial direction.

6. The rack assist type power steering apparatus of claim 5, wherein a tool coupling portion to which a tool is coupled is formed on an outer circumferential surface of the support end.

7. The rack assist type power steering apparatus of claim 2, wherein a fastening groove formed in a circumferential direction is provided on an outer peripheral surface of the ball nut to which the nut pulley is coupled, and a fastening member is coupled to the fastening groove.

8. The rack assist type power steering apparatus of claim 7, wherein the fastening member is formed in a ring shape with one side cut off and is supported at an end of the support end.

9. The rack assist type power steering apparatus of claim 1, wherein an inner circumferential surface of the support end of the nut pulley is press-fitted to the outer circumferential surface of the ball nut and coupled thereto.

10. The rack assist type power steering apparatus of claim 9, wherein a fixing groove is formed on an outer circumferential surface of the ball nut to which the nut pulley is coupled, and is caulked and fixed to an end of the support end of the nut pulley.

11. The rack assist type power steering apparatus of claim 10, wherein the fixing groove is one or more, and when two or more are provided, they are arranged at equal intervals in the circumferential direction of the ball nut.

12. The rack assist type power steering apparatus of claim 9, wherein a fastening groove formed in a circumferential direction is provided on an outer peripheral surface of the ball nut to which the nut pulley is coupled, and a fastening member is coupled to the fastening groove.

13. The rack assist type power steering apparatus of claim 12, wherein the fastening member is formed in a ring shape with one side cut off, and the fastening member is coupled to the fastening groove to be supported by an end of the support end.

14. The rack assist type power steering apparatus of claim 9, wherein the support end is formed to protrude in the axial direction with a step difference in a radial direction from the belt coupling portion to support an opposite end of the inner race of the bearing in the axial direction.

* * * * *